No. 886,770. PATENTED MAY 5, 1908.
H. L. DE ZENG.
LENS SYSTEM FOR MEASURING THE REFRACTION OF THE EYE.
APPLICATION FILED DEC. 31, 1906.
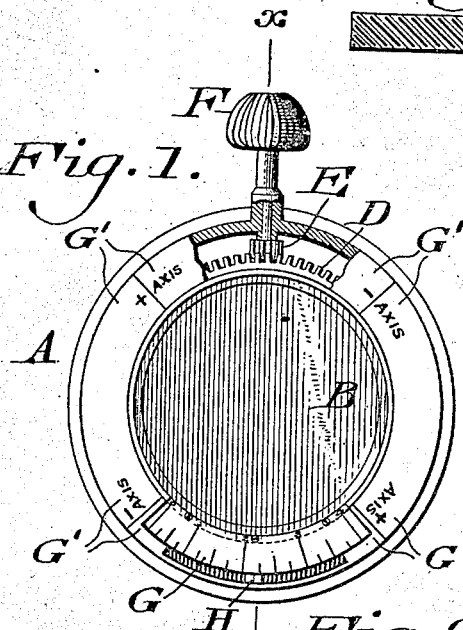
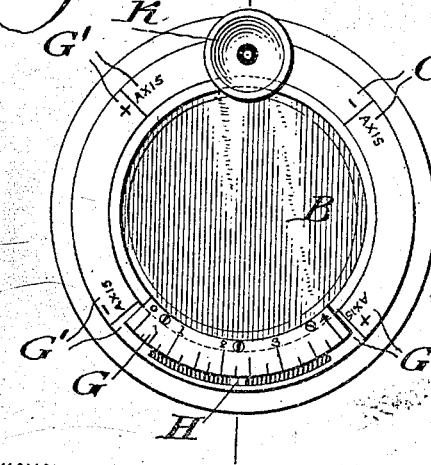

UNITED STATES PATENT OFFICE.

HENRY L. DE ZENG, OF PHILADELPHIA, PENNSYLVANIA, ASSIGNOR TO THE DE ZENG-STANDARD COMPANY, A CORPORATION OF NEW JERSEY.

LENS SYSTEM FOR MEASURING THE REFRACTION OF THE EYE.

No. 886,770.          Specification of Letters Patent.          Patented May 5, 1908.

Application filed December 31, 1906. Serial No. 350,291.

*To all whom it may concern:*

Be it known that I, HENRY L. DE ZENG, a citizen of the United States, residing in the city and county of Philadelphia, State of Pennsylvania, have invented a new and useful Lens System for Measuring the Refraction of the Eye, of which the following is a specification.

My invention consists of a lens system for measuring the different meridians of the eye embodying a plurality of rotatable lenses possessing unequal refraction in their different meridians, means for rotating said lenses with respect to each other about a common center, means for recording the various optical values produced by the rotation of the said lenses and means for locating the cylindrical axes resultant from said lens combination, the device being adaptable to the cell of an optical trial frame or some other suitable holder provided with a vernier graduated in degrees and also provided with means permitting the rotation of the device intact about a geometrical center.

Figure 1 represents a face view of a rotary lens system for eye testing embodying my invention. Fig. 2 represents a section thereof on line *x—x*, Fig. 1. Fig. 3 represents a side elevation of one of the lenses employed. Fig. 4 represents a section of said lens at a right angle to that shown in Fig. 2. Fig. 5 represents a face view of another form of the device embodying my invention. Fig. 6 represents a section on line *y—y*, Fig. 5. Fig. 7 represents a section of a portion on line *z—z*, Fig. 6. Fig. 8 represents a side elevation of one of the lenses employed. Fig. 9 represents a section thereof on line *a—a*, Fig. 8.

Similar letters of reference indicate corresponding parts in the figures.

Referring to the drawings: A designates a casing within which are mounted the lenses B and C, the same being respectively plano-convex and plano-concave cylinders, the rim of each of said lenses having thereon, a circular rack D, with which meshes the pinion E whose shaft is connected with the stem F whereby by operating the latter, rotation is imparted to the lenses B and C in reverse order, said stem in the present instance, projecting radially from the casing A.

Connected with the rim of the lens B is the scale G, the same appearing at the front of the casing A, and connected with the rim of the lens C is the index H, which projects forwardly from said rim through a chamber in said casing and occupies a position adjacent to the periphery of the scale G so as to point to the graduations thereof.

On the face of the casing A are the characters + and —, the words "Axis" and the meridian marks as at G' for locating the optical axes of the combination as more particularly hereinafter referred to. On the periphery of the casing A is the annular flange A', which projects radially therefrom beyond the same. By this provision, the device is adapted to be used in the cell of a regular oculist's trial frame or other suitable holder, and permitted to be revolved therein for the purpose of locating the required position of the cylindrical axis before the eye.

In Fig. 5, I show another form of effecting the reverse rotation of the lenses, the same embodying a plurality of pinions J which mesh with each and with the racks on the rims of the lenses, the shafts of said pinions being mounted on the casing A, one of the same being connected with the stem K, the latter projecting outwardly from the side of the casing, the operation, however, being the same as that produced by the mechanism shown in the other figures.

The lenses possessing unequal refraction in their different meridians, will, if rotated with respect to each other in reverse order about a common center, produce a variety of foci in the following manner:—As there are four different forms of lenses employed for the measurement and correction of astigmatism of the eye all of which possess unequal refraction in their different meridians, known as the plano-cylinder, the sphero-cylinder, the cross cylinder and the toric-cylinder, any of which I might use with equal results, I have for simplicity's sake, shown my invention made up with the plano-cylinders.

I employ a plano-convex and a plano-concave cylinder of the initial power say of four diopters each so mounted in the double rotatable cell, that when their axes are parallel, and they are consequently neutral, the pointer registers zero on the scale. By rotating them in opposite directions, and thus separating their axes, a positive quantity is obtained in one meridian, and a negative quantity of equal amount is obtained in the meridian at a right angle thereto. The rotation of the lenses, therefore, from that point at which their axes are parallel to a point at which their axes are at a right angle with one another, will obtain all of the positive powers from zero to four diopters in one meridian, and likewise all of the negative powers from zero to four diopters in the meridian at a right angle thereto as indicated by the minus and plus meridian axis marks.

As one meridian of the lens system represents a positive, and the other meridian at a right angle thereto a negative quantity at all times excepting when the axes of the cylinders are parallel, the equivalent to a variety of lenses in both plus and minus can be obtained and recorded upon the scale by the degree of rotation of the said lenses. It will thus be seen that my invention obviates the necessity of employing a large variety of lenses and their frequent interchange when measuring the eye for astigmatism and other errors.

Having thus described my invention, what I claim as new and desire to secure by Letters Patent, is:—

1. The combination of a plurality of lenses possessing the physical qualities of a cylinder, means for reversely rotating said lenses with respect to each other about a common center, means for recording the various focal equivalents produced by the rotation of said lenses, means for locating the cylindrical axis of the said lens combination, and a spaced body having an outwardly extending portion to hold the same in a trial frame or other suitable holder.

2. The combination of a plurality of lenses possessing the physical qualities of a cylinder, means for reversely rotating said lenses with respect to each other about a common center, means for recording the various focal equivalents produced by the rotation of said lenses, means for locating the cylindrical axis resultant from said lens combination, and a spaced body having an outwardly extending circular portion to hold the same in a trial frame or other suitable holder and permits the rotation of the device intact about a geometrical center.

HENRY L. DE ZENG.

Witnesses:
 JOHN A. WIEDERSHEIM,
 WM. C. WIEDERSEIM.